United States Patent Office 2,946,810
Patented July 26, 1960

2,946,810

11β-FORMYLOXY STEROIDS AND PROCESS FOR MANUFACTURING SAME

Eugene P. Oliveto, Bloomfield, and Emanuel B. Hershberg, West Orange, N.J., assignors to Schering Corporation, Bloomfield, N.J., a corporation of New Jersey No Drawing. Filed Apr. 8, 1954, Ser. No. 421,948

10 Claims. (Cl. 260—397.45)

The present invention relates to a functional derivative of 11β-hydroxy steroids which can readily be hydrolyzed to regenerate the 11β-OH group.

The present application is a continuation-in-part of our copending application Serial No. 316,324, filed October 22, 1952, now Patent No. 2,781,369.

More particularly, the present invention relates to an improved method of reversibly protecting the 11β-OH group of steroids containing the same, but containing no other substituent in the C-ring; that is, to a method employing a reagent which is capable readily of protecting the 11β-hydroxyl, but at the same time is relatively easily split off to enable the 11β-hydroxyl to be regenerated.

In the manufacture of various physiologically active compounds, and particularly of adrenal hormones and of intermediates for the preparation of such hormones, starting steroid compounds are employed or are available which have only an 11β-OH substituent on the C-ring, and also an hydroxyl group in one or more of the 3-, 17-, 20-, and 21-positions. In the course of the preparation of the desired hormone or of an intermediate therefor, it becomes necessary to subject the starting compound to various chemical reagents, such as oxidizing and halogenating agents for the conversion of one or more alcohol groups into a keto group, or for introducing a nuclear double bond by substituting halogen, preferably bromine, in the nucleus and subsequently dehydrohalogenating, or for introducing halogen, such as bromine, into the 21-methyl group of pregnane compounds to be followed by treatment with alkali or an alkali metal salt to introduce a hydroxyl or ester group into the 21-position, and the like wherein, however, it is necessary to prevent any permanent change in the 11β-OH group.

As described in our above-mentioned copending application, prior efforts to acylate the 11β-hydroxyl group of 11β-hydroxy perhydrocyclopentanophenanthrene compounds having no other substituent in the C-ring have proved unsuccessful. Under the usual conditions of acylation with the usual acylating agents such as acetic anhydride in pyridine, the 11β-hydroxyl fails to esterify, and if a reaction does occur, it is one of dehydration, resulting in the deformation of a Δ$^{9,11}$-double bond. In all examples described in the literature, acylation of an 11β-hydroxyl of steroid compounds has necessitated the presence of a 3,9-epoxide, a 12-ketone or some other activating neighboring group which must ultimately be eliminated.

According to the invention described in said co-pending application, esterification of the 11β-OH group of steroids having no other substituent in the C-ring, is effected by treating the steroid with an acetylating (or higher homologous acylating) agent and with a strong acid catalyst, but under otherwise mild conditions. However, the formed 11β-esters are difficult to hydrolyze without effecting undesired changes at other points in the molecule; and so far as we are aware, hydrolysis of steroid 11β-esters has not been accomplished by chemical means where no activating group was attached to the C-ring.

We have now made the surprising discovery that formylating agents differ radically from acetylating and other acylating agents with respect to their reactivity toward the 11β-hydroxyl of the above-mentioned type of steroids and, further, with respect to the ease of hydrolysis of the formed 11β-formate group. Whereas the 11β-acetates, propionates, butyrates, benzoates, etc. of 11β-OH steroids, once produced are very difficult, if not impossible, to hydrolyze by chemical means, we have found that the 11β-OH can be relatively easily formylated and the formyl ester can be quite easily hydrolyzed after the operations on other substituents of the steroid molecule have been completed. We have found further that the 11β-formyl group, while readily hydrolyzable, is not as easily split off by hydrolysis as formyloxy groups, and likewise other ester groups (such as acetoxy, propionoxy and other lower fatty acid groups, succinoxy and other dicarboxylic aliphatic acid groups; and also aromatic acid groups like benzoyloxy and the like) at one or more other positions in the steroid compound, such as the 3,17,20 and 21-positions. This difference makes it possible partially to hydrolyze steroids having an 11β-formyloxy group and the same or different acyloxy groups at one or more other positions in the molecule, so as to regenerate the free hydroxyl at such other positions to enable further changes to be made in the steroid molecule such as those referred to above, while the 11β-position remains protected against such changes.

As will readily be understood, the present invention is applicable to the treatment of steroids of various kinds provided only that they have an 11β-hydroxyl group which is not activated by the presence of another substituent in the C-ring.

Our invention thus encompasses, among others, saturated and unsaturated etiocholanes and androstanes having an 11β-OH group, and yielding compounds of the general formula

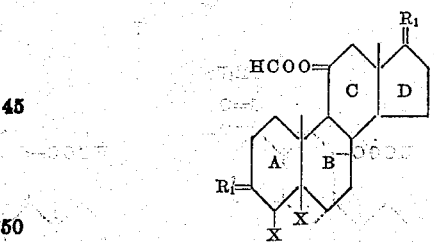

wherein $R_1$ is a member of the group comprising O

and

and X, X are a member of the group comprising H, H and a double bond, the acyloxy and alkoxy groups being preferably lower members of the aliphatic series, like acetoxy, propionoxy, isovaleroxy, methoxy, propoxy, etc., although aromatic derivatives, like benzoyloxy, benzyloxy, etc. are not included.

Our invention is, however, presently of greatest value in connection with the synthesis of saturated and unsaturated pregnane and allopregnane compounds and will accordingly be described in further detail with reference thereto. The intermediates having the pregnane carbon skeleton and prepared in accordance with the present invention are of the following general formula:

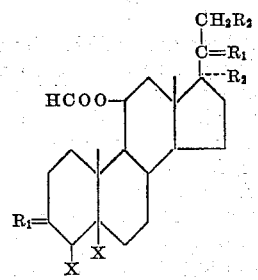

wherein $R_1$ is as above defined; $R_2$ is a member of the group comprising H, OH and acyloxy, and X, X are a member of the group comprising H, H and a double bond.

Other hydroxyl groups which may be attached to the steroid nucleus will be acylated in the course of our process. However, as will be shown below, all acyloxy groups with the exception of the 11β-formyloxy group can be easily removed by mild alkaline hydrolysis. Our invention, by thus utilizing the greater resistance of the 11β-formlyoxy group to hydrolysis, accordingly provides a novel method for the synthesis of physiologically active 11β-hydroxy compounds related to the adrenal and other hormones, or of intermediates for use in the manufacture of such hormones.

The following equations depict the synthesis of $\Delta^4$-pregnen-11β,17α,21-triol-3,20-dione 11-formate (Compound F 11-formate) with the aid of the process of the present invention.

M. P. 174–177° C. $[\alpha]_D + 57.0°$ (CHCl$_3$). Hydrolysis of I with aqueous methanolic sodium hydroxide at room temperature overnight regenerates the starting triol Ia. Partial hydrolysis of I is effected by (a) refluxing with aqueous methanolic sodium bicarbonate, (b) sodium methylate in methanol-tetrahydrofuran at room temperature, (c) Amberlite IRA–400 and methanol at room temperature. The product obtained in all three cases is pregnan-3α,11β,17α-triol-20-one 11-formate (II), M.P. 160–166° C. Bromination at C–21 (IIa), followed by acetoxylation with potassium acetate, produces pregnan-3α,11β,17α,21-tetrol-20-one 11-formate 21-acetate (V). Oxidation of V by means of an oxidizing agent yields pregnan-11β,17α,21-triol-3,20-dione 11-formate 21-acetate (VI). Bromination at C–4 (VIa), followed by dehydrobromination in the usual manner, gives Compound F 11-formate 21-acetate (VII). Hydrolysis of VII with either sodium bi-carbonate, or hydrochloric acid, yields the physiologically active Compound F 11-formate (VIIa). Hydrolysis of either VII or VIIa with sodium hydroxide over night at room temperature produces Compound F.

The oxidation of compound V can be accomplished with a variety of oxidizing agents, such as N-halogeno-acetamide and N-halogeno succinimide, preferably the N-bromo compounds, and also with alkali metal chromates and chromic acid. The bromination at C–4 can be effected with bromine and acetic acid, or by the method described in the copending application of Eugene P. Oliveto and Corinne E. Gerold, Serial No. 287,612, filed May 13, 1952, now Patent No. 2,684,375, by reaction of a keto steroid having a nuclear methylene group adjoining such keto group, with bromine in a

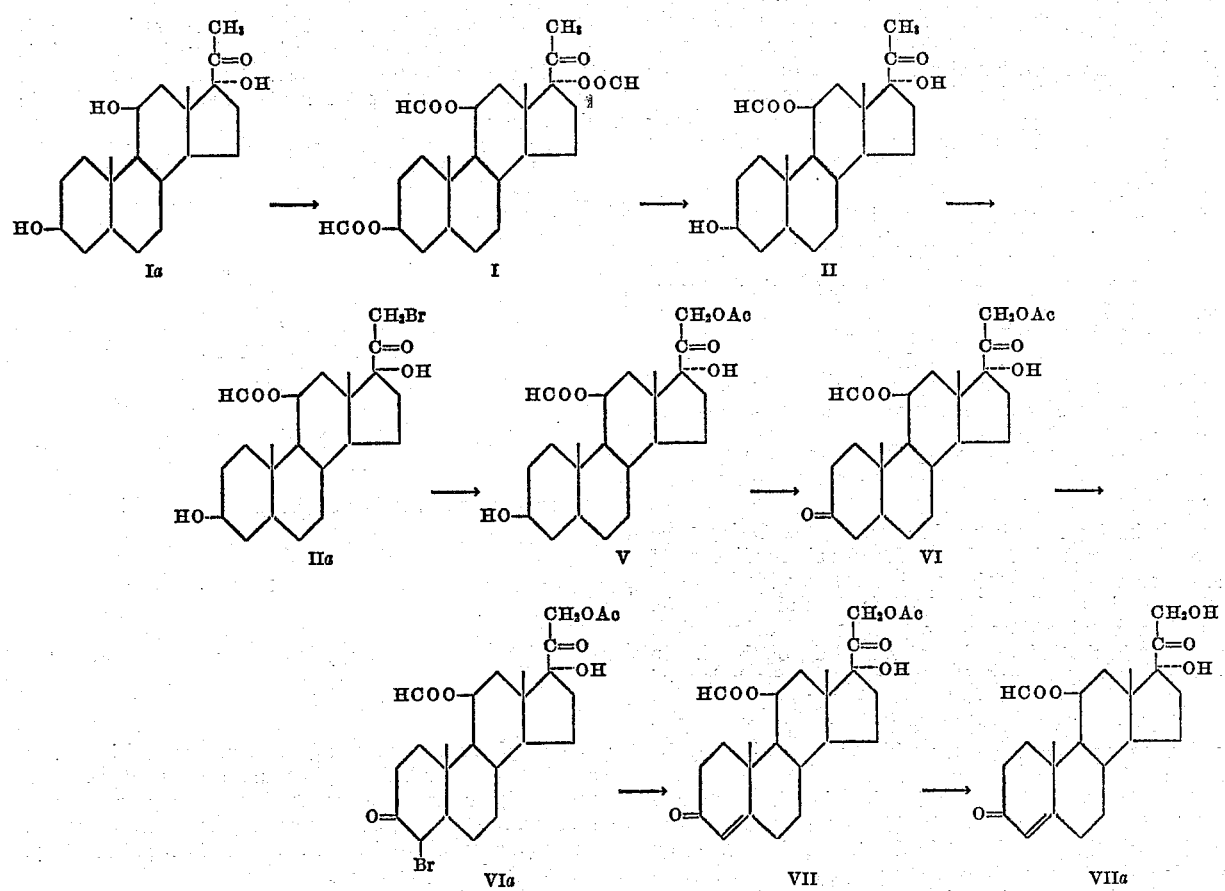

Pregnan-3α,11β,17α-triol-20-one (Ia) upon treatment with 98–100% formic acid and perchloric acid (or p-toluene sulfonic acid) yields the 3,11,17-triformate (I), solvent medium composed of a tertiary alcohol and an inert solvent for the keto-steroid which is miscible with the tertiary alcohol and containing a strong mineral acid.

The 21-bromide IIa can be converted into an ester group other than the acetate by reaction with the corresponding alkali metal salt, such as the propionate, butyrate, or other lower aliphatic acid salt, or the benzoate or other aromatic carboxylic acid salt.

An analogous procedure can be used for the production of Δ⁴-pregnen-17β,17α-diol-3,20-dione 11-formate.

By oxidation of the 11-mono-formate II with one of the usual oxidizing agents, there is obtained pregnandioldione monoformate (VIII). Introduction of the Δ⁴-double bond is accomplished by bromination and dehydrobromination in the usual manner to yield X.

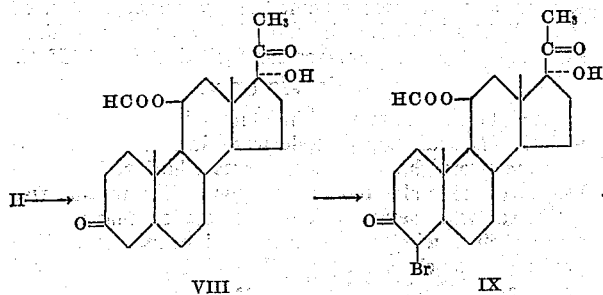

VIII    IX

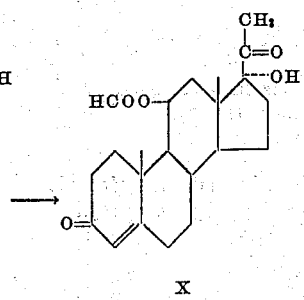

X

Our invention has a number of important advantages over other processes. The 11β-hydroxyl can now be protected in chemical reactions on other parts of the molecule which were heretofore either very difficult or impossible to perform on 11β-hydroxy steroids without altering such hydroxy group. For example, bromination at C-21 in the presence of an 11β-hydroxy group results in a very small yield of the desired 21-bromide because of the facile oxidation of the 11-hydroxyl group by the brominating mixture. In addition, oxidation of other hydroxyl groups such as that at C-3 in the presence of a C-11 hydroxyl group heretofore was best carried out by means of an Oppenauer reaction. However, this procedure is tedious and the yields are mediocre. By protecting the 11β-hydroxyl group with a formyloxy group, oxidation of the other hydroxyl groups can now be carried out quickly, conveniently and in high yield by means of other common and more efficient oxidizing agents. In addition, all of the active hormones containing an 11β-hydroxyl group can now be converted to the 11β-formates. These compounds, while qualitatively retaining the original physiological activities, differ considerably in their rates of absorption and thus generate a corresponding change of response of the organism under treatment. Also, in contrast to the 11β-acetates and homologous esters produced by the process described in our above-mentioned application Serial No. 316,324, the 11β-formates can be hydrolyzed by relatively strong bases at room temperature to yield the 11β-hydroxy compounds.

As indicated above, the formic acid esters can be obtained by reacting the 11β-hydroxy steroid with formic acid in the presence of perchloric or p-toluene sulfonic acid. Other strong acids can be used as catalysts, such as sulfuric, hydrochloric, trichloracetic, benzene sulfonic, and the like which have no oxidizing or other decomposing action on the steroid. In place of formic acid, other formylating agents can be used, such as formic-acetic anhydride and isopropenyl formate.

The formylating reaction can take place at slightly elevated temperatures, but is preferably conducted at about 25° C. or below, a range of 5° to 25° C. being satisfactory. In some cases it is desirable to conduct the reactions in an inert atmosphere, such as nitrogen, argon, carbon dioxide, and the like.

It will be seen from the foregoing that we have provided a simple and effective way of protecting the 11β-hydroxy group unactivated by the presence of another substituent in the C-ring, by treatment with a formylating agent, particularly formic acid, and that any other hydroxy groups which are simultaneously formylated can be readily hydrolyzed by organic or inorganic acids, or by mild alkaline hydrolysis. These other hydroxy groups, and also other parts of the steroid molecule, can then be operated on in various ways which would normally undesirably alter a free hydroxyl group in the 11β-position. After such other operations are completed, the 11β-formyloxy group, in contradistinction to other known 11β-acyloxy groups, can then be hydrolyzed with relatively strong alkaline hydrolyzing agents, such as alkali metal hydroxides and carbonates, like the sodium and potassium compounds, at approximately room temperature.

The invention is of particular utility in the synthesis of Compound F and its 21-esters, and likewise of pregnanes and pregnenes generally, having one or more keto groups, especially at the 3- and 20-positions. Insofar as we are aware, the 11β-formyloxy steroids represent the first 11β-esters of 11β-hydroxy steroids which can be readily hydrolyzed by chemical agents, while at the same time being sufficiently more resistant to hydrolysis than ester groups at other points in the molecule to enable such other ester groups to be hydrolyzed for further operations on the resulting free hydroxyl groups.

The following examples describe the invention in greater detail but are presented only by way of illustration, and not as indicating the scope of the invention.

EXAMPLE 1

*Pregnan-3α,11β,17α-triol-20-one 3,11,17-triformate (I)*

A solution of 10.0 g. of pregnan-3α,11β,17α-triol-20-one in 100 ml. of 98-100% formic acid and containing 4 ml. of 70-72% perchloric acid was kept at 5° C. for 48 hours. The mixture was poured into water and the precipitated solid removed by filtration. Crystallization from methanol yielded 5.38 g. of (I), M.P. 167-172° C. The analytical sample, crystallized once more from methanol, melted at 174-177° C.; [α]$_D$ +57.0° (CHCl₃).

*Analysis.*—Calcd. for $C_{24}H_{34}O_7$: C, 66.34; H, 7.89. Found: C, 66.50; H, 8.06.

HYDROLYSIS OF I

A mixture of 0.50 g. of I, 40 ml. of methanol and 5 ml. of 1 N aqueous sodium hydroxide was stirred until the solids had dissolved and was then allowed to stand overnight at 30° C. Acetic acid was added to neutralize the alkali and the solvent was removed under reduced pressure. Addition of water, followed by filtration, gave 0.21 g. of a solid, M.P. 170-195° C. Recrystallization from acetone-hexane yielded pregnan-3α,11β,17α-triol-20-one; M.P. 205-209° C. The melting point of a mixture with authentic material was undepressed and the infrared spectra were identical.

EXAMPLE 2

*Pregnan-3α,11β,17α-triol-20-one 11-formate (II)*

A. A mixture of 5.0 g. of I, 200 ml. of methanol, 2.90 g. of sodium bicarbonate and 40 ml. of water was refluxed for 2.5 hours. After neutralization with acetic acid, the solution was diluted with water and extracted with methylene chloride. The organic extracts were washed with water, dried over sodium sulfate and evaportaed to dryness. The residue, upon treatment with ether, yielded 0.25 g. of crystalline II, M.P. 160–166° C.

B. A solution of 0.5 g. of I in 25 ml. of tetrahydrofuran and 25 ml. of methanol was treated with a solution of 0.75 g. of sodium methylate in 10 ml. of methanol under an atmosphere of argon. After five minutes, 0.72 ml. of water was added and three minutes later the excess alkali was neutralized with acetic acid. The solution was concentrated under reduced pressure, water was added and the precipitated solid removed by filtration. Crystallization from ether-hexane yielded 0.14 g. of II, M.P. 158–162° C.

C. A solution of 1.0 g. of I in 50 ml. of methanol was stirred for two hours at 25° C. with 4.0 g. of Amberlite IRA–400 resin. The resin was then removed by filtration and the filtrate evaporated to dryness, leaving 0.88 g. of an oil; its infrared spectrum was identical with that of II.

Hydrolysis of the monoformate with sodium hydroxide as described above also yielded the starting triol, pregnan-3α,11β,17α-triol-20-one.

EXAMPLE 3

*Pregnan-11β,17α-diol 3,20-dione 11,17-diformate (IV)*

A solution of 1.0 g. of pregnan-11β,17α-diol-3,20-dione (III) and 0.10 g. of p-toluene sulfonic acid in 10 ml. of 98–100% formic acid was allowed to stand overnight at 25° C. The mixture was then poured into water and the precipitated solid was removed by filtration. Recrystallization from acetone-hexane yielded pregnan-118β,17α-diol-3,20-dione 11,17-diformate (IV), M.P. 240–245° C. The analytical sample, crystallized twice more from acetone-hexane, melted at 256–264° C., [α]$_D$ +47.4° (dioxane).

*Analysis.*—Calcd. for $C_{22}H_{30}O_4$: C, 68.29; H, 7.97. Found: C, 68.47; H, 8.17.

HYDROLYSIS OF IV

A. A suspension of 1.0 g. of IV in 80 ml. of methanol and 10.0 ml. of 1 N aqueous sodium hydroxide was stirred for 19 hours at 25° C. One ml. of acetic acid was added, the solution concentrated under reduced pressure, water was added and the precipitate collected by filtration; it weighed 0.82 g., M.P. 200–210° C. Recrystallization from acetone-hexane yielded 0.64 g., M.P. 214–222° C. A mixed melting point and comparison of infrared spectra showed this product to be identical with pregnan-11β,17α-diol-3–20-dione (III).

B. A mixture of 1.0 g. of IV, 20 ml. of methanol, 1.0 g. of potassium carbonate and 6 ml. of water was stirred for 20 hours at 25° C. After addition of 1.5 ml. of acetic acid, the solution was concentrated under reduced pressure. When crystallization began, the suspension was diluted with water and the solid was collected by filtration; 0.82 g., M.P. 190–196° C. Crystallization from acetone-hexane yielded 0.55 g. of III, M.P. 211–214° C.

EXAMPLE 4

*Pregnan-3α,11β,17α,21-tetrol - 20 - one 11 - formate 21-acetate (V)*

A solution of 950 mg. of II in 20 ml. of C.P. chloroform was brominated at 25° C. by the dropwise addition of a solution of 0.41 g. of bromine in 10 ml. of C.P. chloroform. Two grams of potassium acetate were added and the solvent removed under reduced pressure; 50 ml. of acetone and 2 g. of potassium acetate were added and the resulting suspension refluxed for three hours. The acetone was removed under reduced pressure, water was added and the product collected by filtration. The solid (V) was first sludged with ether, then crystallized from aqueous methanol, M.P. 160–165° C.

EXAMPLE 5

*Pregnan-11β,17α,21 - triol - 3,20 - dione 11-formate 21-acetate (VI)*

A solution of 1.43 g. of V in 15 ml. of methylene chloride and 15 ml. of t-butyl alcohol was treated with 1.34 g. of N-bromo-acetamide at 5° C. After four hours at this temperature in the dark, sodium sulfite solution was added and the mixture extracted with methylene chloride. The organic extracts were washed twice with water, dried over sodium sulfate and evaporated to dryness. The residue crystallized easily on treatment with ether; 1.43 g. of VI were obtained, M.P. 180–193° C. Recrystallization from acetone-hexane yielded 0.80 g. of VI, M.P. 214–217° C. The analytical sample, crystallized twice more from acetone-hexane, melted at 222–225° C.

HYDROLYSIS OF VI

A solution of 1.0 g. of VI in 50 ml. of methanol and 10 ml. of 1 N sodium hydroxide was stirred at room temperature overnight. Acetic acid was added and the solvent removed under reduced pressure. The residue was extracted with methylene chloride, the organic extracts were washed with water, dried and evaporated. The product was chromatographed on alumina to yield pregnan-11β,17α,21-triol-3,20-dione.

EXAMPLE 6

*Δ$^4$-pregnen-11β,17α,21-triol-3,20-dione 11-formate 21-acetate (VII)*

A solution of 1.0 g. of VI in 5 ml. of methylene chloride and 5 ml. of t-butyl alcohol was brominated by the dropwise addition of a solution of 0.38 g. bromine in 5 ml. of methylene chloride and 5 ml. of t-butyl alcohol. The methylene chloride was removed under reduced pressure and water was added to precipitate 4-bromopregnan-11β,17α,21-triol 3,20-dione 11-formate 21-acetate (VIa).

Dehydrobromination of VIa was accomplished via the semicarbazide. A mixture of 1.5 g. of the 4-bromide, 400 mg. of semicarbazide, 65 ml. of t-butyl alcohol and 40 ml. of chloroform was stirred for two hours at room temperature. The solvent was then removed under reduced pressure, water was added, and the precipitated Δ$^4$-pregnen-11β,17α,21-triol-3,20-dione 11-formate 21-acetate 3-semicarbazone removed by filtration. This product was then dissolved in 15 ml. of acetic acid containing 5 ml. of water and 300 mg. of pyruvic acid and the mixture refluxed 10 minutes. Addition of water and cooling precipitated Δ$^4$ - pregnen - 11β,17α,21 - triol-3,20-dione 11-formate 21-acetate (VII).

HYDROLYSIS OF VII

Exactly as described for the hydrolysis of VI, VII was hydrolyzed to Compound F (Δ$^4$-pregnen-11β,17α,21-triol-3,20-dione), M.P. 220–222° C.

EXAMPLE 7

*Pregnan-11β,17α-diol-3,20-dione 11-formate (VIII)*

A. A suspension of 0.81 g. of IV in 8 ml. of C.P. chloroform was chilled in an ice bath and treated with a cold solution of 1.70 ml. of conc. HCl in 2.8 ml. of water. After shaking for 26 hrs. at 25°, the solution was diluted with water and the aqueous layer extracted with methylene chloride. The combined extracts were washed with dilute sodium bicarbonate solution, water, dried over sodium sulfate, and evaporated. The residue crystalized upon treatment with ether, yielded crude compound VIII, M.P. 181–4° (195–200° upon recrystallization from acetone-hexane).

B. A solution of 1.0 g. of IV in 50 ml. of tetrahydrofuran and 50 ml. of C.P. methanol was treated with a solution of 0.28 g. of sodium methylate in 20 ml. of methanol under an atmosphere of argon. After 5 minutes, 0.27 ml. of water was added; 3 minutes later the excess alkali was neutralized by the addition of acetic acid. The solution was then concentrated under reduced pressure, water added, and the precipitate removed by filtration. Recrystallization from acetone-hexane yielded VIII, M.P. 198–200°, $[\alpha]_D = 47.1°$.

Analysis.—Calcd. for $C_{22}H_{32}O_5$: C, 70.18; H, 8.57. Found: C, 70.38; H, 8.81.

EXAMPLE 8

$\Delta^4$-pregnen-11β,17α-diol-3,20-dione 11-formate (IX)

In the manner described above, 2.0 g. of VIII were brominated at C-4 and dehydrobrominated via the semicarbazone to yield IX.

EXAMPLE 9

$\Delta^4$-pregnen-11β,21-diol-3,20-dione 11,21-diformate (X)

A solution of 5.0 g. of pregnan-11b,21-diol-3,20-dione in formic acid and perchloric acid was formylated in the above manner to yield pregnan-11β,21-diol-3,20-dione 11,21-diformate (Xa). Bromination and dehydrobromination yielded X.

EXAMPLE 10

$\Delta^4$-pregnen-11β,21-diol-3,20-dione 11-formate (XI)

Hydrolysis of X with either hydrochloric acid or sodium methylate as described above, yielded Compound XI.

EXAMPLE 11

$\Delta^4$-pregnen-11β,21-diol-3,20-dione (XII)

Overnight hydrolysis of XI with sodium hydroxide as previously described yielded XII.

Using the procedures described in the above examples, the following further 11β-formyloxy steroids can be readily prepared: etiocholan-3α,11β,17β-triol 11-formate and 3,11,17-triformate; etiocholan-3α,11β-diol-17-one 11-formate and 3,11-diformate; etiocholan-11β-ol-3, 17-dione 11-formate; etiocholan-11β,17β-diol-3-one 11-formate and 11,17-diformate; $\Delta^4$-etiocholan-11β,17β-diol-3-one 11-formate and 11,17-diformate; androstan-3α,11β-diol-17-one 11-formate and 3,11-diformate; androstan-11β-ol-3,17-dione 11-formate; androstan-11β,17β-diol-3-one 11-formate and 11,17-diformate; pregnan-3α,11β-diol-20-one 11-formate and 3,11-diformate; pregnan-11β-ol-3,20-dione 11-formate; pregnan-3α,11β,20α-triol 11-formate and 3,11,20-triformate; pregnan-3α,11β,20β-triol 11-formate and 3,11,20-triformate; pregnan-11β,20α-diol-3-one 11-formate and 11,20-diformate; pregnan-11β,20β-diol-3-one 11-formate and 11,20-diformate; $\Delta^4$-pregnen-11β-ol-3,20-dione 11-formate; $\Delta^4$-pregnen-11β,20α-diol-3-one 11-formate and 11,20-diformate; $\Delta^4$-pregnen-11β,20β-diol-3-one 11-formate and 11,20-diformate; pregnan-3α,11β,17α,20β,21-penta-ol 11-formate and penta-formate; $\Delta^4$-pregnen-11β,17α,20-triol-3,20-dione 11,17-diformate and 11,17,20-triformate; $\Delta^4$-pregnen-11β,17α,20β,21-tetrol 11-formate and tetra-formate; pregnan-3α,11β,20β,21-tetrol 11-formate and tetra-formate; $\Delta^4$-pregnen-11β,20β,21-triol-3-one 11-formate and triformate; pregnan-3α,11β,17α,20β-tetrol 11-formate and tetraformate; pregnan-11β,20β,21-triol-3-one 11-formate and triformate; pregnan-11β,17α,20β-triol-3-one 11-formate and triformate; $\Delta^4$-pregnen-11β,17α,20β-triol-3-one 11-formate and triformate; allopregnan-11β,20β-diol-3-one 11-formate and diformate; allopregnan-3α,11β,20β-triol 11-formate and triformate; allopregnan-3α,11β,17α,20β-tetrol 11-formate and tetra-formate; allopregnan-11β,17α,20β-triol-3-one 11-formate and triformate; allopregnan-3α,11β,20β,21-tetrol 11-formate and tetra-formate; allopregnan-11β,20β,21-triol-3-one 11-formate and triformate; 16α,17α-oxidopregnan-3α,11β,21-triol-20-one 11-formate and 3,11,21-triformate; 16α,17α-oxidopregnan-11β,21-diol-3,20-dione 11-formate and 11,21-diformate; 16α,17α-oxido-$\Delta^4$-pregnen-11β-ol-3-one 11-formate; and 16α,17α-oxidopregnan-11β-ol-3,20-dione 11-formate.

By "strong acid" as employed herein is meant an acid having a dissociation constant K equal to at least $10^{-2}$. This includes the hydrohalic acids, like hydrochloric acid, which are generally not as satisfactory as the other acids named hereinabove. The acid employed should, however, not be one which will oxidize the 11β-hydroxyl. For best results, as already indicated, the acylation of the 11β-hydroxyl should take place at approximately room temperature.

Variations from the specific procedures set out hereinabove may be resorted to within the scopes of the appended claims without departing from the spirit of the invention. Thus, to prepare $\Delta^4$-pregnen-11β,17α, 21-triol-3,20-dione 11,17,21-triester, Compound VII or VIIa can be further acylated in known manner with any desired acylating agent; while to produce the 11,17-diformate, the triformate can be carefully hydrolyzed at room or slightly elevated temperatures with sodium bicarbonate.

It will also be evident from the foregoing that it is immaterial what the specific acyl groups may be at the positions other than the 11β-position, as they will all hydrolyze more readily than the 11β-formyl group.

We claim:

1. Pregnan-3α,11β,17α-triol-20-one 11β-formate.
2. $\Delta^4$-pregnen-11β,17α,21-triol-3,20-dione 11-formate.
3. $\Delta^4$-pregnen-11β,17α,21-triol-3,20-dione 11-formate 21-acetate.
4. Process for the manufacture of pregnan-3α,11β,17α, 21-tetrol-20-one 11β-formate 21-acetate, which comprises reacting pregnane-3α,11β,17α-triol-20-one with a formylating agent in the presence of a strong acid catalyst to convert the same into the triformate, subjecting the triformate to a mild hydrolysis to produce pregnane-3α,11β, 17α-triol-20-one 11β-formate, reacting the latter with bromine to produce the 21-bromo compound, and reacting the bromo compound with an alkali metal acetate.
5. Process for the manufacture of $\Delta^4$-pregnen-11β,17α, 21-triol-3,20-dione, which comprises reacting pregnane-3α,11β,17α-triol-20-one with a formylating agent in the presence of a strong acid catalyst to convert the same into the triformate, subjecting the triformate to a mild hydrolysis to produce pregnane-3α,11β,17α-triol-20-one 11β-formate, reacting the latter with bromine to produce the 21-bromo compound, reacting the bromo compound with an alkali metal salt of an organic carboxylic acid to produce the 21-ester, oxidizing the 3-hydroxy group to a keto group, brominating the so-formed pregnane-11β,17α, 21-triol-3,20-dione 11-formate 21-ester to form the corresponding 4-bromo compound, dehydrobrominating the product to introduce a double bond at the 4-position, and hydrolyzing the product by reacting the ester groups with hydroxyl.
6. Process for the manufacture of $\Delta^4$-11β,17α,21-triol-3,20-dione-11-formate 21-acetate, which comprises reacting pregnane-3α,11β,17α-triol-20-one with a formylating agent in the presence of a strong acid catalyst to convert the same into the triformate, subjecting the triformate to a mild hydrolysis to produce pregnane-3α,11β,17α-triol-20-one 11β-formate, reacting the latter with bromine to produce the 21-bromo compound, reacting the bromo compound with an alkali metal acetate to produce the 21-acetate, oxidizing the 3-hydroxy group to a keto group, brominating the so-formed pregnane-11β,17α,21-triol-3,20-dione 11-formate-21-acetate to form the corresponding 4-bromo compound, and dehydrobrominating the product to introduce a double bond at the 4-position.
7. Pregnan-3α,11β,17α,21-tetrol-20-one 11β-formate 21-acetate.
8. Pregnan-11β,17α-diol-3,20-dione 11β,17α-diformate.
9. Pregnan-11β,17α,21-triol-3,20-dione 11-formate 21-acetate.
10. Compounds of the group consisting of saturated and Δ⁴ unsaturated pregnanes having the following respective formulae:

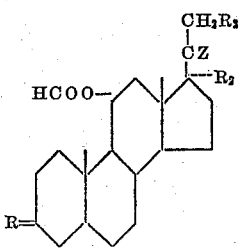

and

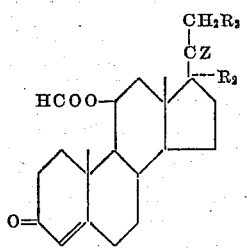

wherein R is a member of the class consisting of =O;

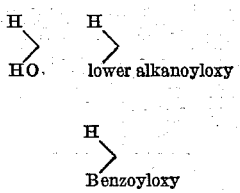

and $$\overset{H}{\underset{Benzoyloxy}{\diagdown}}$$

and $R_2$ is a member of the class consisting of H, OH, and low alkanoyloxy and benzoyloxy groups; and Z is a member of the class consisting of =O and (H, OH).

References Cited in the file of this patent

UNITED STATES PATENTS

| | | |
|---|---|---|
| 2,183,589 | Reichstein | Dec. 19, 1939 |
| 2,533,124 | Levin | Dec. 5, 1950 |
| 2,647,134 | Hogg | July 28, 1953 |

OTHER REFERENCES

Reichstein: Helv. Chem. Acta 19, 37–38 (1936).

Fieser et al.: Natural Products Related to Phenanthrene, 3rd. edition, pages 424–426 (1949).